Feb. 16, 1971     C. KNUTH     3,563,670
MARINE PROPELLER AND ITS MOUNTING
Filed Jan. 31, 1969     5 Sheets-Sheet 1
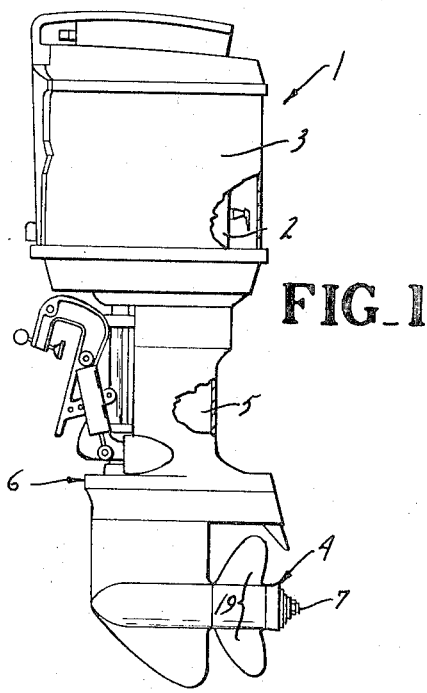
FIG_1
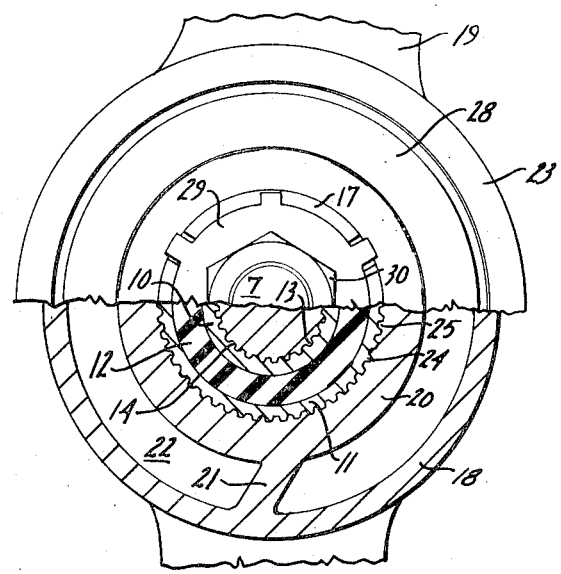
FIG_3
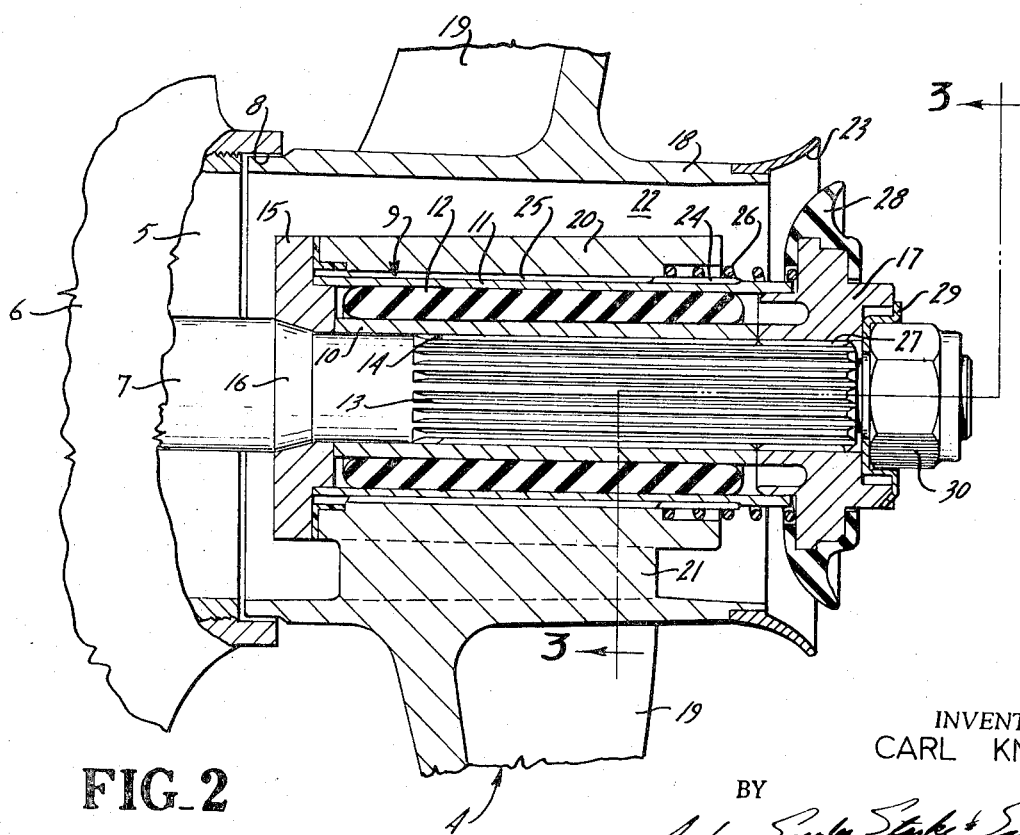
FIG_2
INVENTOR.
CARL KNUTH
BY
Attorneys

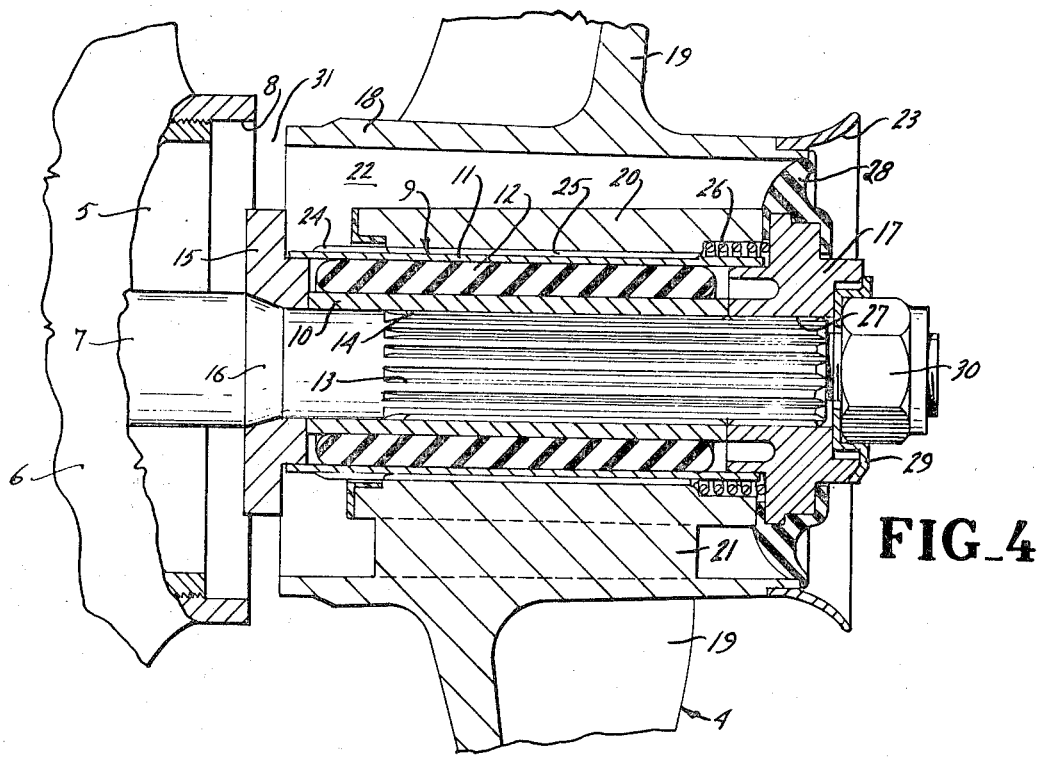
FIG_4
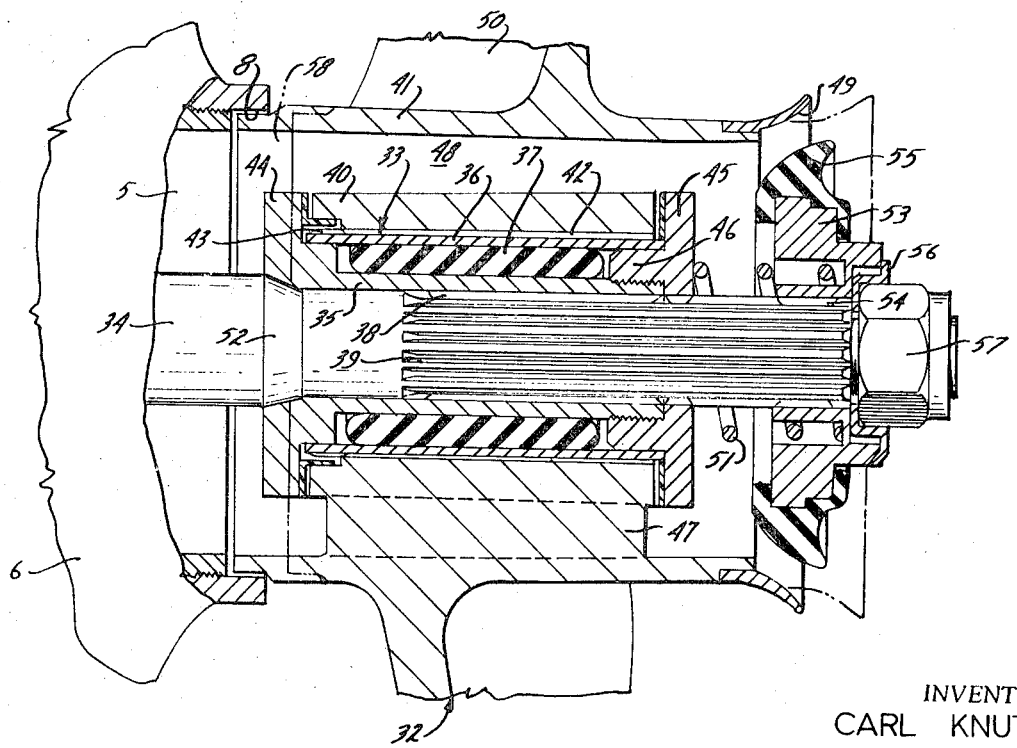
FIG_5
INVENTOR.
CARL KNUTH

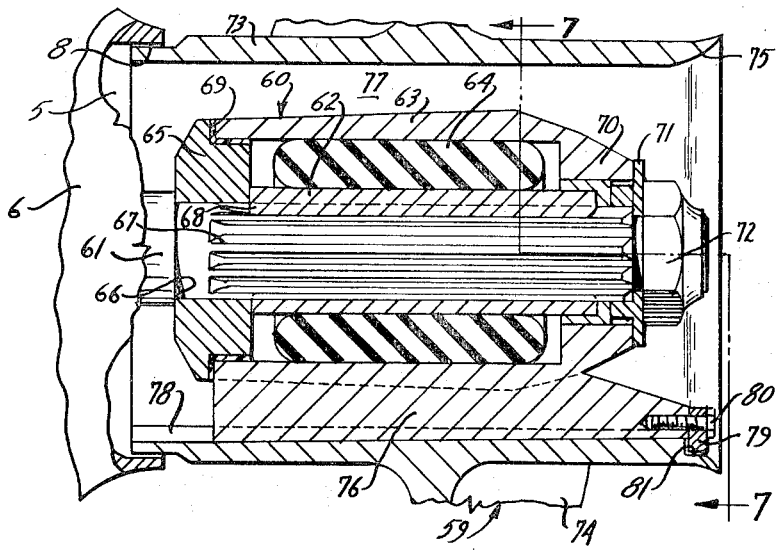

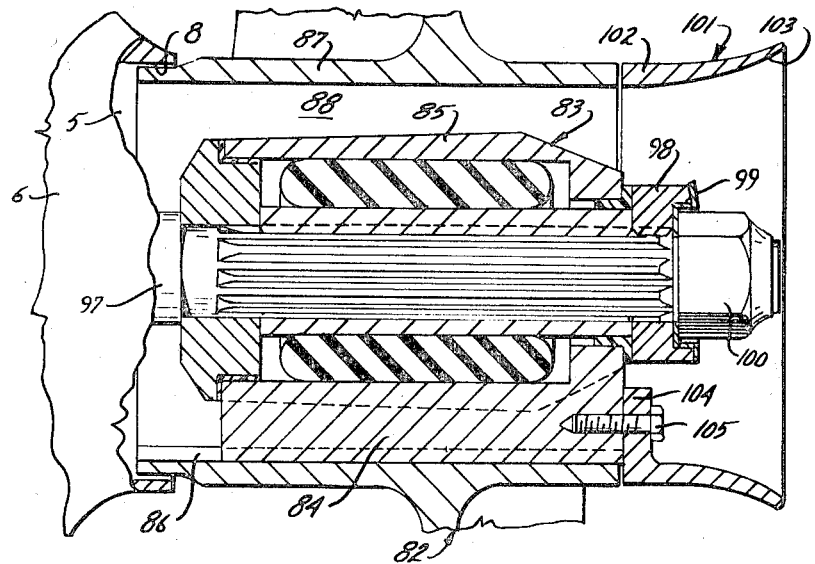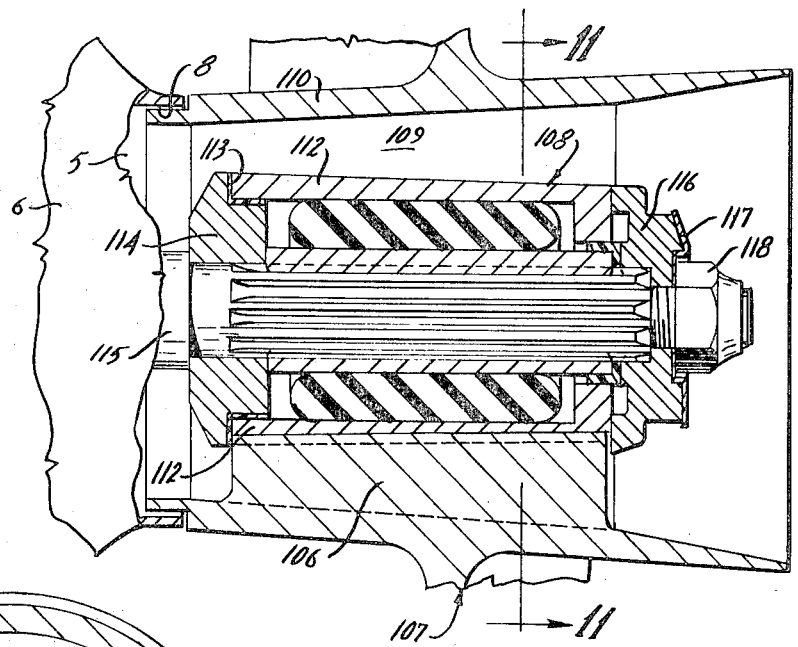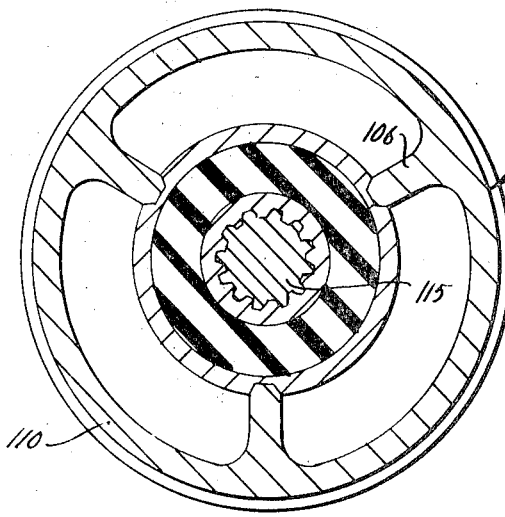

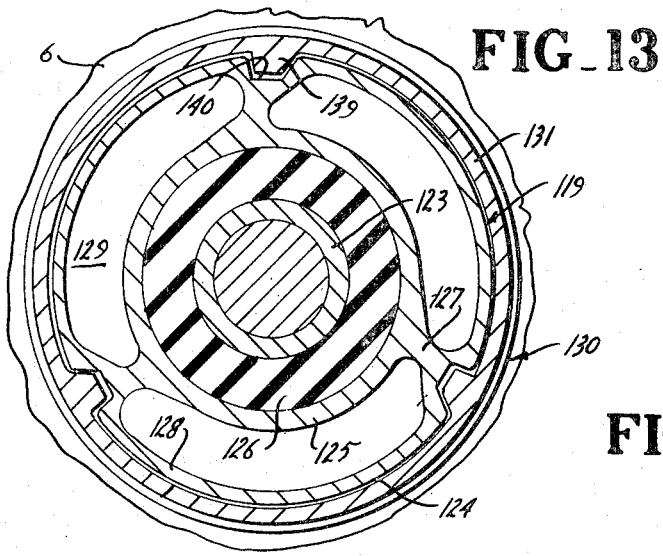
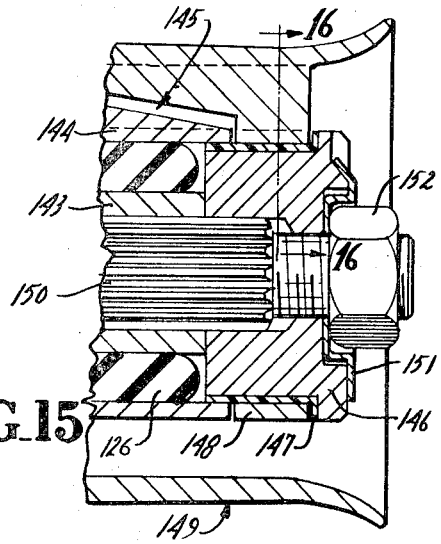
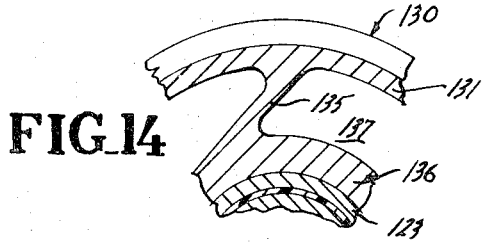
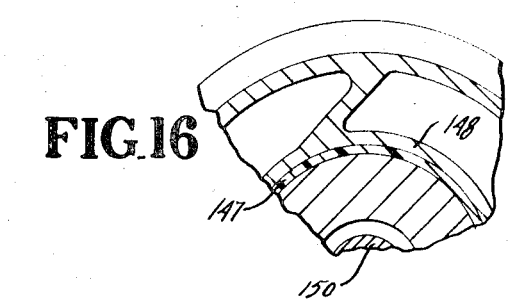
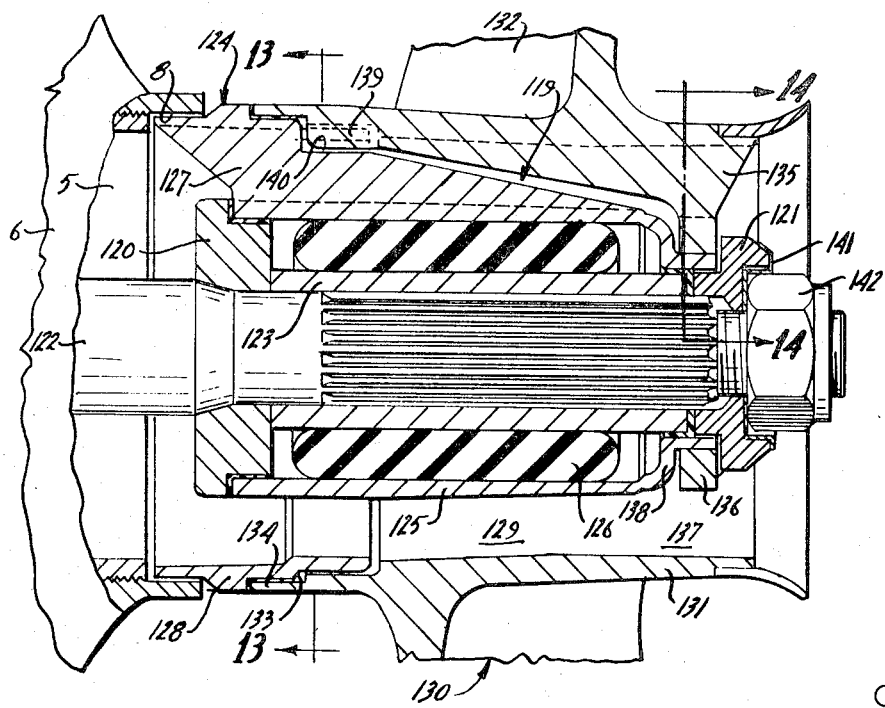

United States Patent Office 3,563,670
Patented Feb. 16, 1971

3,563,670
MARINE PROPELLER AND ITS MOUNTING
Carl Knuth, Fond du Lac, Wis., assignor to Brunswick Corporation, Chicago, Ill., a corporation of Delaware
Filed Jan. 31, 1969, Ser. No. 795,435
Int. Cl. B63h 21/26, 23/30
U.S. Cl. 416—93
21 Claims

ABSTRACT OF THE DISCLOSURE

It is disclosed for an engine driven outboard propulsion unit having passage means for conducting the exhaust gases from the engine through said unit, a propeller separable from its slip clutch assembly mounting with provision in the propeller and/or its mounting for receiving the exhaust gases from the propulsion unit passage means and conducting such gases through the propeller hub for discharge rearwardly of the propeller at least during operation of the propulsion unit in the forward direction.

---

This invention relates to a marine propeller of the type providing for discharge of engine exhaust products through the propeller hub and the mounting for such a propeller.

In marine propulsion units wherein the engine exhaust products are conducted to the propeller hub for discharge, the propeller hub structure generally includes a pair of radially spaced sleeves forming an exhaust passage therebetween. In the mounting of the propeller on the propeller shaft, slip clutch means are generally interposed between the shaft and the propeller, with the inner hub sleeve of the propeller serving as the driven hub sleeve of the slip clutch. Since the slip clutch means forms a part of the propeller, they are generally made available to the public and sold as a unitary assembly. Thus, substitution or replacement of one propeller for another requires replacement of the slip clutch as well. It is generally an object of this invention to provide a propeller mounting providing for discharge of engine exhaust products through the hub of the propeller and wherein the slip clutch and propeller are separately mounted on the propeller shaft.

The invention is applicable to an engine driven marine propulsion unit having a housing portion for receiving the exhaust products from the engine and conducting such products downwardly therein for discharge underwater from the unit. According to the invention, a generally horizontal propeller shaft is rotatably supported in the housing portion of the unit and projects rearwardly therefrom through an opening in the housing portion. A slip clutch assembly including an outer sleeve member is carried on the shaft rearwardly of the housing portion. A propeller is mounted on the shaft and includes a hub sleeve member having a diameter generally corresponding to the diameter of the housing portion opening and is aligned therewith and spaced radially outwardly from the slip clutch sleeve member. Means drivingly connect the spaced propeller hub sleeve member and slip clutch sleeve member and provide passages through the propeller hub communicating with the housing portion opening for receiving the engine exhaust products from the housing portion and conducting such products through the propeller hub for discharge rearwardly of the propeller, with the connecting means being disengageable to render the propeller separable from the slip clutch assembly.

The drawings furnished herewith illustrate the best mode of carrying out the invention as presently contemplated and described hereinafter.

In the drawings:

FIG. 1 is a side elevation of an outboard motor having a separable propeller in accordance with this invention and providing for engine exhaust discharge through the propeller hub;

FIG. 2 is an enlarged partial sectional view of a separable propeller and its mounting;

FIG. 3 is a partial sectional view taken generally on line 3—3 of FIG. 2;

FIG. 4 is a view generally similar to that of FIG. 2 and shows the propeller in the reverse drive position;

FIG. 5 is an enlarged partial sectional view showing a further embodiment of a separable propeller and in phantom lines shows the propeller in reverse drive position;

FIG. 6 is an enlarged partial sectional view and shows a still further embodiment of a separable propeller;

FIG. 7 is a view taken generally on line 7—7 of FIG. 6;

FIG. 8 is an enlarged partial sectional view and shows the combination of a separable propeller and diffuser ring;

FIG. 9 is an enlarged partial sectional view generally similar to FIG. 8 and shows a different mode of assembly for the separable propeller and diffuser ring;

FIG. 10 is an enlarged partial sectional view and shows a further embodiment of a separable propeller;

FIG. 11 is a view taken generally on line 11—11 of FIG. 10;

FIG. 12 is an enlarged partial sectional view and shows a further embodiment of a separable propeller construction;

FIG. 13 is a view taken generally on line 13—13 of FIG. 12;

FIG. 14 is a view taken generally on line 14—14 of FIG. 12;

FIG. 15 is an enlarged partial sectional view and shows a still further embodiment of a separable propeller construction; and FIG. 16 is a view taken generally on line 16—16 of FIG. 15.

Referring to the drawings, an outboard propulsion unit for watercraft such as the outboard motor 1 includes an internal combustion engine 2 within the cowl enclosure 3 at the upper end of the motor for driving a propeller 4 at the lower end thereof. Driving rotation of propeller 4 is selectively reversible by means, not shown, to provide for operation of the motor 1 in forward and reverse directions as desired. The exhaust gases from engine 2 are conducted downwardly through passage means 5 in the lower housing portion 6 of the motor 1 for discharge underwater through the hub of propeller 4.

According to the embodiment of FIGS. 2-4, the propeller 4 is carried by the generally horizontal propeller shaft 7 which projects rearwardly through the opening 8 of housing portion 6 and is driven by the engine 2, through means not shown. The shaft 7 is selectively reversible by operation of a transmission means, not shown, to rotate the propeller 4 in opposed directions corresponding to forward and rearward movement of the propulsion unit.

A slip clutch assembly 9 is disposed on the projecting portion of shaft 7 rearwardly of housing portion 6 and comprises inner and outer sleeve members 10 and 11, respectively, between which an elastomeric annulus 12 is sandwiched. The inner sleeve 10 of the slip clutch assembly 9 is rotationally locked relative to the propeller shaft 7 by engagement of complementary axial splines 13 and 14 on the shaft and inner sleeve, respectively. Sleeve 10 is axially secured on shaft 7 between the forwardly disposed annular stop collar 15 engaged with the tapered shoulder 16 on the shaft and the rearwardly disposed annular retainer member 17.

The propeller 4 is separable or independently replaceable relative to the slip clutch assembly 9 and includes an outer hub sleeve member 18 which carries the blades 19 and an inner hub sleeve member 20 spaced radially inwardly from and connected to the outer hub sleeve member 18 by a plurality of circumferentially spaced vanes 21. The vanes 21 divide the annular space between the hub sleeve members 18 and 20 into a plurality of axially extending passages 22 which communicate with the passage means 5 through the opening 8 rearwardly of the lower housing portion 6 and serve to conduct the engine exhaust gases rearwardly for discharge underwater through the rearwardly disposed propeller hub opening 23.

The separable propeller 4 is rotationally locked onto the outer sleeve 11 of the slip clutch assembly 9 by engagement of complementary axially extending splines 24 and 25 on the sleeve and propeller, respectively. Propeller 4 is movable axially relative to the slip clutch assembly 9 and shaft 7, and is biased forwardly into engagement with the stop collar 15 by the coil spring 26 disposed between the retainer member 17 and the inner hub sleeve member 20 of the propeller. With the propeller 4 in engagement with the stop collar 15, as generally shown in FIG. 2, the outer hub sleeve member 18 overlaps within the opening 8 of housing portion 6 to provide a generally continuous passage for the exhaust gases from the passage means 5 into the propeller hub passages 22.

The retainer member 17 on the end of the propeller shaft 7 is rotationally locked on the shaft by engagement of the complementary splines 27 and 13 on the retainer member and shaft, respectively, and engages with the end of the inner sleeve member 10 of the slip clutch assembly 9 to secure the assembly against the stop collar 15. Retainer member 17 carries a peripherally disposed annular resilient valve member 28 which in the forward position of propeller 4 is spaced from the outer hub member 18 to define the annular character of discharge opening 23. The propeller 4, slip clutch assembly 9 and retainer member 17 are secured onto the propeller shaft 7 by the lock washer 29 and nut 30 disposed on the end of the shaft.

During forward drive operation of the outboard motor 1, propeller rotation develops a thrust which along with the biasing force of spring 26 tends to maintain the propeller 4 forwardly against the stop collar 15, as generally shown in FIG. 2, to provide for discharge of the engine exhaust gases into the outflow of the propeller slipstream through the discharge opening 23. When propeller rotation is reversed for reverse drive operation, the attendant thrust reversal forces the propeller 4 to move rearwardly relative to the slip clutch assembly 9 and shaft 7 against the biasing pressure of spring 26 to close the opening 23 by engagement with the valve member 28 while simultaneously forming a radial discharge opening 31 forwardly of the propeller by virtue of its separation from the housing portion 6, as generally shown in FIG. 4, to also provide in reverse for the discharge of the exhaust gases into the outflow side of the propeller slipstream.

For servicing or when desired, the propeller 4 may be removed and/or replaced by removal from shaft 7 of nut 30, washer 29, valve retainer member 17 and spring 26 while the slip clutch assembly 9 may remain in place. So long as the slip clutch assembly 9 remains undamaged, it may be continued in service even for mounting replacement propellers. The axial movement of propeller 4 relative to the slip clutch assembly 9 in service will serve to prevent deleterious corrosion buildup therebetween.

In the embodiment of FIG. 5 a separable propeller 32 and slip clutch assembly 33 are shown which, though separable, move together as a unit relative to the propeller shaft 34 in response to propeller thrust to provide for engine exhaust discharge into the outflow of the propeller slipstream for both forward and reverse drive operation.

The slip clutch assembly 33 generally includes inner and outer hub sleeve members 35 and 36, respectively, having an elastomeric annulus 37 sandwiched therebetween. The clutch assembly 33 is rotationally locked on the shaft 34 by engagement of complementary splines 38 and 39 on the inner hub member and shaft, respectively. The separable propeller 32 having radially spaced inner and outer hub sleeve members 40 and 41, respectively, is rotationally locked on the slip clutch assembly 33 by engagement of the complementary splines 42 and 43 between the propeller inner hub member and the slip clutch outer hub member 36. The slip clutch outer hub 36 and the propeller inner hub 40 are disposed between the longitudinally spaced enlarged stepped forward portion 44 on the inner hub member 35 and the radial flange 45 on nut 46 threaded onto the rearward end of sleeve member 35 to form a unitary assembly, with some clearance being provided for the hub member 36 to permit the slip clutch to yield in response to vibration and/or shock loading. Axial clearance may also be provided for the propeller hub member 40 to permit some axial movement between the propeller 32 and the slip clutch outer sleeve member 36 to prevent corrosion buildup therebetween.

The radially spaced hub sleeve members 40 and 41 of propeller 32 are connected by a plurality of circumferentially spaced vanes 47 forming axially extending passages 48 for conducting engine exhaust gases through the propeller for discharge through the opening 49 rearwardly thereof. The blades 50 are carried on the outer hub member 41 of the propeller.

The unitary assembly comprising the propeller 32 and slip clutch assembly 33 is movable axially on shaft 34 and is shown biased forwardly by the coil spring 51 to place the inner hub member 35 of the slip clutch assembly into engagement with the annular tapered shoulder 52 on the shaft. In the forward position of the unitary assembly the outer sleeve member 41 of the propeller 32 is overlapped within the opening 8 of the housing portion 6 to place the propeller hub passages 48 in communication with the passage means 5 of the lower housing portion.

The coil spring 51 is disposed between the flanged nut 46 of the unitary assembly and the retainer member 53 which is rotationally locked on the shaft 34 by engagement of the complementary splines 54 and 39. The retainer member 53 carries the annular resilient valve member 55 peripherally thereof and is confined rearwardly by the washer 56 and nut 57 on shaft 34.

In forward drive operation, the unitary assembly including propeller 32 tends to remain forwardly against the tapered shoulder 52 on the shaft 34 under the influence of propeller thrust and the spring 51 as generally shown in solid lines in FIG. 5 to provide for discharge of the engine exhaust gases into the outflow of the propeller slipstream through the discharge opening 49. Upon reversal of propeller rotation for reverse drive operation, the corresponding thrust reversal forces the unitary assembly including propeller 32 rearwardly relative to shaft 34 against the biasing pressure of spring 51 to close the discharge opening 49 by engagement of the propeller with the valve member 55 as generally shown in phantom lines in FIG. 5. The movement of the unitary assembly rearwardly simultaneously forms or opens the radial discharge opening 58 forwardly of the propeller 32 as the propeller separates or moves away from the housing portion 6 so that the discharge of exhaust gases is once again into the outflow of the propeller slipstream during reverse operation of the propulsion unit and the propeller acts on a solid flow of water to the blades 50.

For removal and/or replacement of the separable propeller 32, the flanged nut 46 must be removed from the unitary assembly. The otherwise undamaged slip clutch assembly 33 may be continued in service.

According to the embodiment of FIGS. 6 and 7 the propeller 59 is not separable from the propulsion unit housing portion 6 in response to change in propeller thrust as was the case in the foregoing embodiments. The propeller 59 is, however, separable from the slip clutch assembly 60 which transmits the driving torque from the shaft 61 to the propeller 59 and affords relief therebetween by slippage as when the propeller strikes an object.

The slip clutch assembly 60 includes the radially spaced hub sleeve members 62 and 63 which have an elastomeric annulus 64 compressingly disposed therebetween. The inner sleeve member 62 is confined forwardly by the annular stop collar 65 engaged with the shoulder 66 on the shaft 61 and the member 62 is rotationally locked onto the shaft by engagement of the complementary splines 67 and 68 on the shaft and inner sleeve member, respectively. The outer driven hub sleeve member 63 extends forwardly into the peripheral recess 69 of the stop collar 65 and is provided with an inwardly directed flange 70 rearwardly thereof. Bearing seals of a suitable anti-galling material may be interposed both forwardly and rearwardly between the sleeve members 62 and 63 to prevent entry of matter possibly harmful to the resilient annulus 64.

Rearwardly, the slip clutch assembly 60 is held in proper relation by a suitable washer 71 secured by the nut 72 threadedly engaged on the end of the propeller shaft 61.

The hub sleeve member 73 of the propeller 59 is spaced radially outward from the driven hub sleeve member 63 of the slip clutch assembly 60 and carries the outwardly extending blades 74. The forward end of sleeve member 73 is disposed with a running clearance within the opening 8 of the lower housing portion 6. During operation of the propulsion unit, the engine exhaust gases moving through the passage means 5 of housing portion 6 are conducted through the propeller 59 between the hub sleeve members 63 and 73 for discharge rearwardly from the propeller opening 75.

The separable propeller 59 is supported relative to the slip clutch assembly 60 by a plurality of longitudinally extending, circumferentially spaced vanes 76 forming a plurality of exhaust conducting passages 77 through the propeller. The vanes 76 are formed integrally with the slip clutch sleeve member 63 and engage within complementary longitudinally extending grooves 78 provided interiorly of the propeller hub sleeve 73 to rotationally lock the propeller onto the driven hub sleeve 63.

The depth of the vanes 76 varies increasingly in the forward direction to provide an interference or wedging fit between the vanes and grooves 78 to provide a lock under forward propeller thrust operation and thereby maintain the position of the propeller relative to the housing portion 6. Rearwardly at least one vane 76 is adapted to carry a lock tab 79 secured to the vane by threaded member 80. The lock tab 79 extends into a corresponding recess 81 formed in the propeller hub sleeve 73 outwardly from the corresponding groove 78 and serves to confine the propeller 59 under reverse thrust. The depth of recess 81 may provide for a slight axial movement of the propeller 59 relative to the slip clutch assembly 60 with changes in propeller thrust to prevent corrosion buildup therebetween.

With the propeller 59 mounted separately from the slip clutch assembly 60, removal and/or replacement of the propeller is a simple matter and is readily accomplished without special tools. According to the embodiment of FIGS. 6 and 7, even the means for securing the slip clutch assembly 60 onto the shaft 61 need not be disturbed during propeller removal and/or replacement.

In the embodiment of FIG. 8, the propeller 82 is generally similarly carried by the slip clutch assembly 83 as was the propeller 59 of FIG. 6, with the longitudinally extending vanes 84 on the driven hub sleeve member 85 being received within corresponding grooves 86 in the hub sleeve member 87 of the propeller and forming the exhaust passages 88 between the propeller and slip clutch assembly. The hub sleeve member 87 of propeller 82, however, terminates with a separable diffuser pump element 89 providing for a more efficient removal of water from the exhaust system during operation. The element 89 includes the outer ring portion 90 which at the forward end thereof closely approximates the diameter of the propeller sleeve member 87 and flares outwardly in a rearward direction to form the exhaust discharge opening 91. The flared outer ring portion 90 of element 89 is connected to its annular central portion 92 by a plurality of vanes 93 which correspond generally to the vanes 84 on the hub sleeve member 85. The central portion 92 of element 89 is keyed on the propeller shaft 94 rearwardly of the slip clutch assembly 83 and secured by the washer 95 and nut 96 engaged on the end of the shaft.

The diffuser element 89 serves to secure the propeller 82 under reverse thrust and precludes direct removal of the separable propeller. While the slip clutch assembly 83 need not be disturbed to effect removal and/or replacement of the separable propeller 82, the diffuser element 89 must be initially removed to provide access to the propeller.

According to the embodiment of FIG. 9, the propeller shaft 97 carries a generally similar slip clutch assembly 83 and separable propeller 82 as shown and described in connection with the embodiment of FIG. 8. A suitable spacer element 98, washer 99 and nut 100 secure the slip clutch assembly 83 on the shaft 97.

The separable diffuser element 101 of FIG. 9 comprises the flared outer ring portion 102 providing an exhaust discharge opening 103 rearwardly thereof. Forwardly, the ring portion 102 is provided with radially inward directed vanes 104 corresponding generally to the vanes 84 on the hub sleeve member 85 of the slip clutch assembly 83 and which terminate with a free end adjacent to spacer element 98. A threaded element 105 extends through the diffuser vane 104 and engages within the corresponding vane 84 to secure the diffuser element 101 to the assembly with the diffuser element thus serving to secure the separable propeller 82 under reverse thrust. The embodiment of FIG. 9 presents the advantage that only the diffuser element 101 need be removed when removal and/or replacement of the propeller 82 is desired, leaving the slip clutch assembly 83 and its securement undisturbed.

In the embodiment of FIGS. 10 and 11, the vanes 106 connecting the separable propeller 107 and slip clutch assembly 108, and forming the exhaust passages 109 therebetween, extend inwardly from the propeller hub sleeve member 110 to engage within corresponding grooves 111 formed in the outer hub sleeve member 112 of the slip clutch assembly. The vanes 106 generally extend between the radial flange 113 on the stop collar 114 carried forwardly on shaft 115 and the rearwardly disposed spacer element 116 secured on the shaft by the washer 117 and nut 118 to position the propeller 107 relative to the housing portion 6. Axial clearance may be permitted the vanes 106 between the collar 114 and the spacer element 116 to provide for slight axial movement with changes in propeller thrust to prevent corrosion buildup between the vanes and corresponding grooves 111, Once again the slip clutch assembly 108 can remain undisturbed, though spacer element 116 must be removed when removal and/or replacement of the separable propeller 107 is contemplated.

According to the embodiment of FIGS. 12 through 14, the slip clutch assembly 119 extends longitudinally between the forwardly disposed stop collar 120 and the rearwardly disposed spacer element 121 on the shaft 122 with the inner drive sleeve member 123 of the clutch assembly splined on the shaft. The outer driven hub member 124 of the clutch assembly 119 comprises a sleeve 125 confining the elastomeric annulus 126 and having a plurality of outwardly projecting vanes 127 which generally taper to an increasing depth forwardly to carry a relatively short forwardly disposed second sleeve member 128 projecting into the opening 8 of the housing portion 6 with a running clearance. The vanes 127 connecting the spaced sleeves 125 and 128 form a plurality of longitudinally extending exhaust passages 129 therebetween adapted to receive the engine exhaust gases from the passage means 5 of the housing portion 6.

The separable propeller 130 carried on the slip clutch assembly 119 includes the hub sleeve member 131 which carries the blades 132. The forward end of the propeller sleeve member 131 engages over the inwardly stepped peripheral portion 133 of the slip clutch sleeve 128 and is generally confined forwardly by the annular radial shoulder 134. The sleeve member 131 is provided with inwardly projecting vanes 135 which generally taper to an increasing depth in the rearward direction and are longitudinally aligned with the vanes 127 on the slip clutch sleeve member 128. Rearwardly the vanes 135 are connected to an annular portion or sleeve 136 spaced inwardly from the propeller hub sleeve 131 to form the exhaust passages 137 through the propeller 130 which are generally aligned with the passages 129 in the slip clutch driven hub member 124. The aligned passages 129 and 137 carry the exhaust rearwardly from the passage means 5 of housing portion 6 for discharge from the propeller 130 through the discharge opening 138 at the rear of the propeller.

The annular portion or sleeve 136 of the separable propeller 130 is carried on the annular inwardly stepped portion 138 provided on the rear end of the slip clutch sleeve member 125. Intermediate the rearwardly disposed propeller sleeve member 136 and the forwardly disposed sleeve member 128 on the slip clutch driven member 124 the aligned vanes 127 and 135 are provided with a driving connection in the form of a longitudinally extending tongue 139 formed as a part of vane 135 which is disposed in a corresponding groove 140 provided in the vane 127.

The separable propeller 130 is confined rearwardly by the radially projecting portion of the spacer element 121 with some axial clearance being provided to permit slight axial movement of the propeller relative to the slip clutch assembly 119 with changes in propeller thrust to prevent undue corrosion buildup between the contacting portions of the slip clutch member 124 and the propeller. Bearing seals of suitable anti-galling material may be interposed between the spaced sleeves of the slip clutch assembly and between the propeller and slip clutch assembly. A suitable lock washer 141 and nut 142 secure the propeller and slip clutch assemblage on the shaft 122. A removal of the spacer element 121 is necessary prior to removal and/or replacement of the separable propeller 130, but the slip clutch assembly 119 need not be disturbed.

FIGS. 15 and 16 show an alternate form for the embodiment of FIG. 12, wherein the spaced inner and outer members 143 and 144, respectively, of the slip clutch assembly 145 remain spaced apart radially at their rear extremity and the annular spacer element 146 abuts against the end of inner sleeve member 143 and along with the annular bearing seal 147 of suitable anti-galling material underlies the end portion of the outer member 144. The inner sleeve 148 of the separable propeller 149 is disposed on the seal member 147 rearwardly of the terminus of the outer slip clutch member 144 and is generally confined rearwardly by a radial portion of the spaced element 146. The propeller and slip clutch assemblage is secured on the shaft 150 by the customary washer 151 and nut 152.

As in the case of previously described embodiments, removal and/or replacement of the propeller 149 can be effected while leaving the slip clutch assembly 145 undisturbed. If the slip clutch assembly 145 remains undamaged, it may be continued in service for mounting even a replacement propeller.

I claim:

1. In an engine driven marine propulsion unit having a housing portion for receiving the exhaust products from the engine and conducting said products downwardly therein for discharge underwater from said unit, a generally horizontal propeller shaft rotatably supported in said housing portion and projecting rearwardly therefrom through an opening therein, a slip clutch assembly carried on the shaft rearwardly of said housing portion and having an outer sleeve member, a propeller having a hub sleeve member spaced radially outwardly from the slip clutch sleeve member, said propeller hub sleeve member having a diameter at the forward end thereof generally corresponding to that of the housing portion opening and being aligned therewith, and means drivingly connecting the spaced propeller hub sleeve member and slip clutch sleeve member and being disengageable to render the propeller separable from the slip clutch assembly and forming passages through the propeller hub communicating with said housing portion opening for receiving the engine exhaust products from said housing portion and conducting said products through the propeller hub for discharge rearwardly of the propeller.

2. The invention as set forth in claim 1 wherein the disengageable means connecting the spaced propeller hub sleeve member and slip clutch sleeve member comprise a plurality of longitudinally extending, circumferentially spaced vanes projecting from one of said members and being interlocked with the other of said members.

3. The invention as set forth in claim 2 wherein the vanes are formed integrally with the slip clutch sleeve member and project outwardly to engage within corresponding grooves in the propeller hub sleeve member, said vanes being wedgingly engaged within said grooves to lock the separable propeller relative to the slip clutch sleeve member under forward thrust operation, and wherein retaining means are provided to lock the propeller relative to the slip clutch sleeve member under reverse thrust operation.

4. The invention as set forth in claim 3 wherein the retaining means for locking the separable propeller under reverse thrust operation comprises at least one lock tab which is securable to a vane on the slip clutch sleeve member and extends radially outward to place the outer portion of the lock tab in alignment with the propeller hub sleeve member.

5. The invention as set forth in claim 3 wherein the retaining means for locking the separable propeller under reverse thrust operation comprises a vaned diffuser element carried on the propeller shaft and having an outer ring portion generally aligned with and forming a rearward extension of the propeller hub sleeve member.

6. The invention as set forth in claim 3 wherein the retaining means for locking the separable propeller under reverse thrust operation comprises a diffuser element having an outer ring portion generally aligned with and forming a rearward extension of the propeller hub sleeve member, and at least one inwardly projecting member on said ring portion adapted for securement to the slip clutch sleeve member.

7. The invention as set forth in claim 2 wherein the vanes are formed integrally with the propeller hub sleeve member and project inwardly to rotationally interlock with the slip clutch sleeve member.

8. The invention as set forth in claim 2 wherein the vanes are formed integrally with the propeller hub sleeve member and project inwardly to engage within corresponding grooves in the slip clutch sleeve member and wherein an annular member secured on the propeller shaft is engageable by the vanes on the propeller hub sleeve member to lock the separable propeller under reverse thrust operation.

9. The invention as set forth in claim 1 wherein the means drivingly connecting the spaced propeller hub sleeve member and slip clutch sleeve member includes a sleeve spaced from and connected to one of said sleeve members and rotationally interlocked with the other of said sleeve members.

10. The invention as set forth in claim 1 wherein the means drivingly connecting the spaced propeller hub sleeve member and slip clutch sleeve member includes a sleeve spaced inwardly from and connected to the propeller hub sleeve member and rotationally interlocked with the slip clutch sleeve member.

11. The invention as set forth in claim 10 wherein the spaced sleeve and sleeve member of the separable propeller are connected by a plurality of longitudinally extending, circumferentially spaced vanes which form the exhaust gas conducting passages through the propeller hub.

12. The invention as set forth in claim 1 wherein the means drivingly connecting the spaced propeller hub sleeve member and slip clutch sleeve member includes a first sleeve spaced from and connected to the slip clutch sleeve member and generally aligned with the propeller hub sleeve member, and a second sleeve spaced from and connected to the propeller hub sleeve member and generally aligned with the slip clutch sleeve member.

13. The invention as set forth in claim 12 wherein the first sleeve is disposed forwardly of the propeller hub sleeve member and the forward portion of said first sleeve is disposed within the housing portion opening with a running clearance therebetween.

14. The invention as set forth in claim 12 wherein the spaced slip clutch sleeve member and first sleeve are connected by a plurality of longitudinally extending, circumferentially spaced vanes forming exhaust passages therebetween and the spaced sleeve member and second sleeve of the separable propeller are connected by a plurality of longitudinally extending circumferentially spaced vanes forming exhaust conducting passages therebetween, the respective vanes on the slip clutch sleeve member and propeller hub sleeve member being generally aligned to place the respective passages in alignment to conduct the engine exhaust gases through the propeller hub for discharge.

15. The invention as set forth in claim 14 wherein at least some portion of the vanes on the slip clutch sleeve member and propeller hub sleeve member, respectively, are rotationally interlocked to drive the separable propeller.

16. A marine propeller and mounting therefor, comprising a rotatable propeller shaft, slip clutch means secured upon said shaft to rotate therewith and having an outer sleeve member capable of slipping rotationally in response to shock loading, a propeller having a hub sleeve member disposed radially outward from the outer sleeve member of said slip clutch means with an annular space therebetween adapted for the flow of gases through the propeller hub, and a plurality of circumferentially spaced, longitudinally extending vanes integral with one of said members and interlocked with the other of said members to drive the propeller rotationally with the outer sleeve member of said slip clutch means, said propeller being removable from the shaft independently of said slip clutch means.

17. A marine propeller and mounting therefor, comprising a rotatable propeller shaft, slip clutch means secured upon said shaft to rotate therewith and having an outer sleeve member capable of slipping rotationally in response to shock loading, a propeller having a hub sleeve member disposed radially outward in spaced relation from the slip clutch sleeve member, and a third sleeve member radially spaced from and integrally connected to one of the propeller hub sleeve member and slip clutch sleeve member to form an annular space adapted for the flow of gases through the propeller hub, said third sleeve member being drivingly interlocked with the other of said members to drive the propeller, said propeller being removable from the shaft independently of said slip clutch means.

18. The invention as set forth in claim 17 wherein the third sleeve member is connected to one of the propeller hub sleeve member and slip clutch sleeve member by a plurality of longitudinally extending, circumferentially spaced vanes forming passages for conducting the gases through the propeller hub.

19. A marine propeller and mounting therefor, comprising a rotatable propeller shaft, slip clutch means secured upon said shaft to rotate therewith and having an outer sleeve member capable of slipping rotationally in response to shock loading, a propeller having a hub sleeve member disposed radially outward in spaced relation from the slip clutch sleeve member, a first sleeve portion radially spaced from and integrally connected to the slip clutch sleeve member, said first sleeve portion being disposed forwardly of and generally aligned with the propeller hub sleeve member, a second sleeve portion radially spaced from and integrally connected to the propeller hub sleeve member, said second sleeve portion being disposed generally rearwardly relative to the slip clutch sleeve member and generally in alignment therewith, said sleeve portions and the respective corresponding sleeve members forming aligned annular spaces adapted for the flow of gases through the propeller hub, and means drivingly connecting said sleeve members to drive the propeller, said propeller being removable from the shaft independently of said slip clutch means.

20. The invention as set forth in claim 19 wherein the respective sleeve portions are connected to the corresponding sleeve members by a plurality of longitudinally extending, circumferentially spaced vanes with the vanes of the respective sleeve members being generally aligned longitudinally to provide aligned passages through the respective members for conducting the gases through the propeller hub.

21. The invention as set forth in claim 20 wherein the aligned vanes of the respective sleeve members are rotationally interlocked between the respective sleeve portions to provide the driving connection for the propeller.

References Cited

UNITED STATES PATENTS

| | | | |
|---|---|---|---|
| 3,113,625 | 12/1963 | Conover | 416—169(X) |
| 3,246,698 | 4/1966 | Kiekhaefer | 416—93 |
| 3,335,803 | 8/1967 | Van Ranst | 416—169 |

EVERETTE A. POWELL, Jr., Primary Examiner

U.S. Cl. X.R.

416—169